H. COOK.
DIAL FOR GAMES AND THE LIKE.
APPLICATION FILED NOV. 9, 1915.

1,221,791. Patented Apr. 3, 1917.

INVENTOR
Harry Cook
BY
Dyker Caufield
ATTORNEYS.

UNITED STATES PATENT OFFICE.

HARRY COOK, OF NEWARK, NEW JERSEY.

DIAL FOR GAMES AND THE LIKE.

1,221,791.     Specification of Letters Patent.     Patented Apr. 3, 1917.

Application filed November 9, 1915. Serial No. 60,477.

*To all whom it may concern:*

Be it known that I, HARRY COOK, a citizen of the United States, and a resident of Newark, county of Essex, and State of New Jersey, have invented certain new and useful Improvements in Dials for Games and the Like, of which the following is a specification.

This invention relates to an improved apparatus for the purpose of amusement, and can be used as a form of game or utilized in disclosing alleged future or past performances or happenings, and is designed to provide a simple and compact method of indicating several different correlated matters on the same dial.

The dial consists of a face plate having a set of identifying numbers or signs, and a pointer provided with spaced projections or indicating points disposed so that when the main or indicating point is on one part of the face, the other points will indicate certain correlated features which in turn can be interpreted by reference to rules, instructions or other written matter not illustrated herewith and which can be changed according to the different uses to which the dial is put.

The object of the invention is to provide a dial that is cheap, but is adapted also to provide such different indications as are in constant fixed relation to each other, the preferred form of pointer comprising a disk or plate which has a square and a triangle placed centrally on a pivot, the triangle and square being fixed in position so that one of the angles of the triangle is placed on one of the angles of the square so that those two points point in the same direction, the other points of the square and the triangle, however, being spaced apart so that they point to different numbers or identifying matter on the face plate, these identifying characters or numbers being usually placed in a circle.

Figure 1:
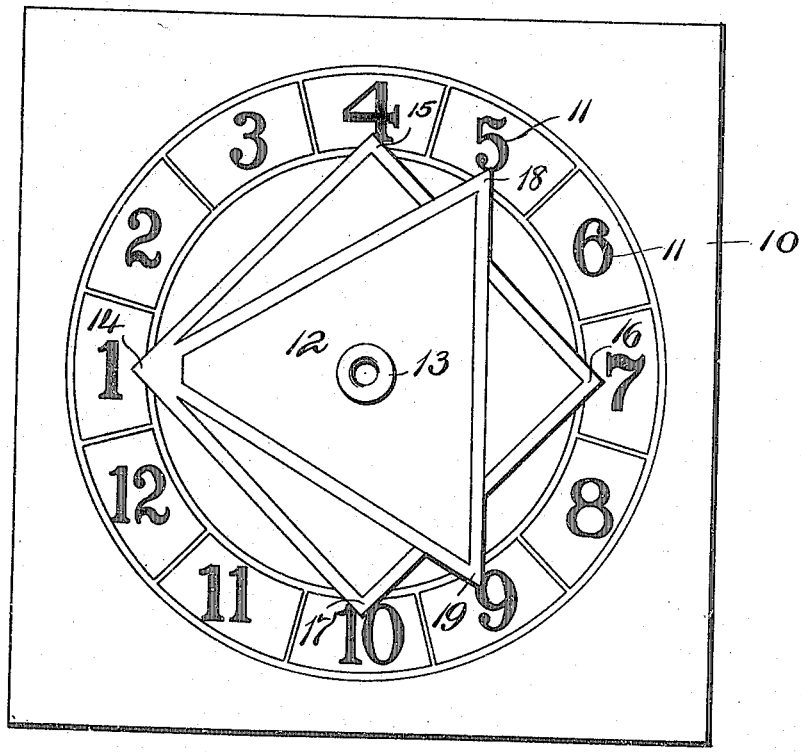
Figure 2:
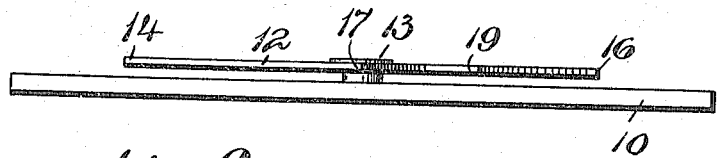

In the drawing I show one form of my dial, Figure 1 being a top or face view of a dial, and Fig. 2 is a side view of the dial shown in Fig. 1.

In the type of dial shown the face plate 10 is made of stiff cardboard or sheet metal, or any other suitable material, and is provided with a set of numerals which in this drawing are shown as arranged in a circle. These numerals are arranged in spaces 11 on the face plate, and while numerals are shown, other indicating devices, such as letters or symbols, such as signs of the zodiac, and other suitable devices, can be placed on the face plate. The pointer 12 of the dial is suitably pivoted, this pivoting taking place at the center so that the dial can be spun or moved on said pivot, the dial being preferably pivoted at a central point so that its movement is concentric. In the form shown the pivoting is done by means of an eyelet 13. The pointer 12 is in the form of two superimposed angular figures having different numbers of angular points and with one of such points in common. In the form shown an equilateral triangle is superimposed upon a square, and the common point is at 14. The square has individual points 15, 16 and 17, and the triangle has the additional points 18 and 19. This disposition of the parts spaces the points 14, 15, 18, 16, 19 and 17 so that they will point at different sub-divisions such as are covered by the numerals on the plate 10, so as to make different combinations. The pointer can be suitably ornamented, and in the form illustrated the square and the triangle have been fully outlined, but that part of the outline that is within the inner edge of the pointer is not essential to the invention. To demonstrate one use of this device in the way of amusement, a chart is used in which, for instance, if a person spins the pointer and the common point 14 stops at number 1, the chart is consulted, which will show that number 1 would be an assumed forecast or reading of the character in certain sub-divisions, so that if the number that the point 15 pointed to would be 4, the number 4 on the pamphlet would be a description of the imaginary habits of the party concerned; if the point 18 pointed to 5 the number 5 would relate to the occupation of the person; number 7, to which the point 16 points, would perhaps relate to the afflictions of the person; number 9, to which the point 19 is directed, might relate to the health, and number 10 might be correlated to number 4 in a sense. In fact it can be arranged so that numbers 1, 4, 7 and 10, when the pointer is in the position shown, would relate to one phase of a person's life and 5 and 9 to another.

In this device the numbers can be replaced by other inscriptions or designs, for instance, the signs of the zodiac, and the point 14 could be placed on the side of the zodiac under which the person playing the game was born, and it could be assumed that the description of the imaginary life and habits and so forth would appertain to such person.

Other forms of games can be played in which this dial is used, the square points pointing to numbers which on the chart would be advantageous, and the ends of the triangle embodying the points 18 and 19 could refer to disadvantageous factors or qualifications in the game being played.

This invention is very inexpensive and can be used as an advertising novelty, and the descriptions of the qualities or circumstances controlled by the numbers or other marks on the dial face can be printed on the back of the plate 10.

Having thus described my invention, I claim:

1. In a device of the class described, the combination of a dial having characters arranged in a circle thereon, and a pointer pivoted to turn on said dial, said pointer having the form of two symmetrical superimposed angular figures differing in the number of their angular points and having one angular point in common.

2. In a device of the class described, the combination of a dial comprising a face plate having characters thereon, and a pointer pivoted on the face plate, the pointer having its outline formed by a square and triangle placed with an angle of each at one point in the periphery.

In testimony that I claim the foregoing, I hereto set my hand, this 6th day of November, 1915.

HARRY COOK.